United States Patent

[11] 3,600,56

[72] Inventor David Silvester Evans
Walworth, England
[21] Appl. No. 712,079
[22] Filed Mar. 11, 1968
[45] Patented Aug. 17, 1971
[73] Assignee Moore Reed (Industrial) Limited
Walworth, England

[54] DIGITAL MULTI-DENOMINATIONAL SCALE MODIFYING MEANS
4 Claims, 8 Drawing Figs.

[52] U.S. Cl. .............................................. 235/154, 235/169
[51] Int. Cl. .............................................. G06f 3/00
[50] Field of Search ....................................... 340/324, 178, 347; 235/92, 168—170, 173

[56] References Cited
UNITED STATES PATENTS
3,245,065 4/1966 Person ..................... 340/324 X
3,343,155 9/1967 Pahlavan ..................... 340/32

Primary Examiner—Maynard R. Wilbur
Assistant Examiner—Charles D. Miller
Attorney—Webster B. Harpman ABSTRACT: The present invention relates to apparatus f modifying the reading of a multidenominational scale of digital measuring system and in a practical embodiment this achieved by classifying the figures of each denomination the scale and of the figures by which they can be shifted in groups such that, in respect to some shifts, the result mt necessarily give rise to a carry to the next higher denominati than the one in which the shift has been made, and in resp( of other shifts, the result must necessarily fail to give rise t( carry to said next higher denomination, whereby only number of shifts, considerably less than the total numt possible, remain in respect of which the need exists to det mine whether the radix of the denomination in question I been exceeded by the shift effected.

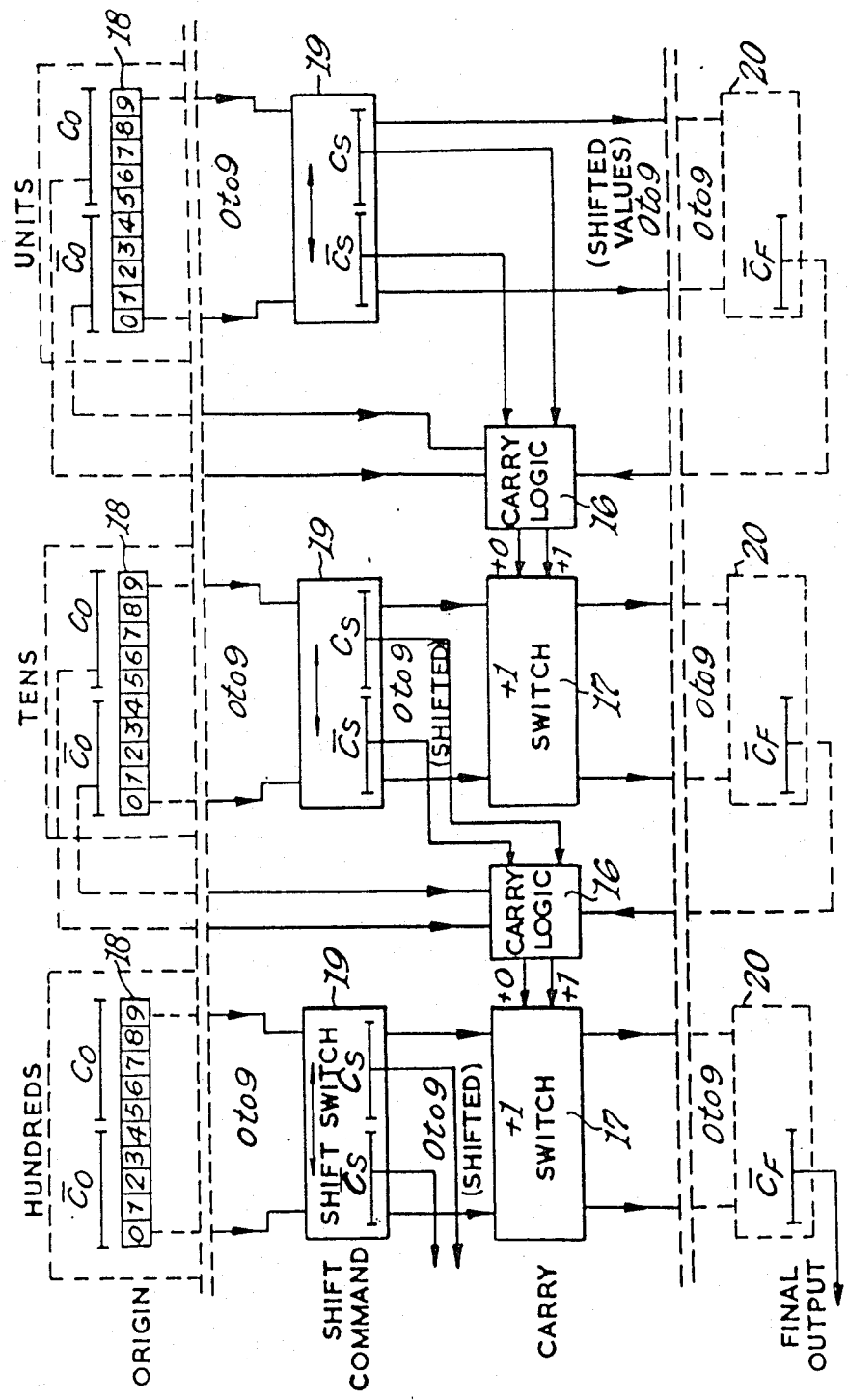

DIGITAL MULTI-DENOMINATIONAL SCALE MODIFYING MEANS

This invention relates to apparatus for modifying the reading of a digital scale by, for example, manual selection of a desired modification.

It is often required to modify the numerical value provided by a digital system or to suppress the zero of the scale used, by an amount which may be varied from time to time by an operator. The output from the measuring device may be changing continuously so that, in effect, continuous subtraction or addition has to be performed.

It will be assumed that there is a transducer in the measuring system, capable of providing a parallel digital output to a set of digital number displays. The number system may be binary, decimal, sexagecimal, coded decimal or any other form. Such transducers may, for example, comprise linear or rotary shaft digitizers, decade switches, optical gratings, digital voltmeter type devices or counters.

In any multidenomination scale a definite physical relationship has to be maintained between the related denominations in order that the scale may give sensible number sequences of the denominations. For example, in a scale of 10, a units change from 9 to 0 must produce a change of the next higher figure in the tens denomination and so on. If any denomination value is changed independently of the other denominations, the carry will occur incorrectly and erroneous readings will result, unless a correction is applied.

Known methods for arriving at the required result involve arithmetic devices such as subtractors and adders which, in a parallel system, are elaborate and expensive.

It is an object of the present invention to provide means for altering a denomination to produce a correct carry, and preferably for altering each denomination independently of all others, but in a given sequence such as by starting from the least significant digit upwards. Once the alterations have been made, the scale sequence follows correctly thereafter.

There is provided by the present invention apparatus for modifying the reading of a multidenominational scale of a digital measuring system, comprising means for shifting any figures of a denomination by a figure within the radix of the denomination, a logic device for determining the carry condition resulting from said shifting, and switch means for modifying by one the reading of the denomination next higher than the shifted denomination in response to any carry produced by said shifting.

In one embodiment of the present invention, said shifting means comprises means for classifying the figures of a denomination in which a shift can be made, into groups (hereinafter called original groups) and means for classifying the figures by which the denomination can be shifted into groups (hereinafter called shift groups), the original and the shift groups being such that when any figure in one of the original groups is shifted by any figure in one of the shift groups, the shift thus effected must necessarily either produce or fail to produce a carry to the next higher denomination, and said logic device is such that solely by the criterion of the shift thus effected, it necessarily either indicates a carry to the next higher denomination or fails to so indicate, as the case may be. Said groups may be such that when any figure in one of the original groups is shifted by any figure in one of the shift groups, the shift (hereinafter called the carry shift) thus effected must necessarily give rise to a carry to the next higher denomination, and that when any figure in a second one of the original groups is shifted by any figure in a second one of the shift groups, the shift (hereinafter called the noncarry shift) thus effected must necessarily fail to give rise to a carry to the next higher denomination; and in this case, said logic device is such that solely by the criterion of the shift effected, it necessarily indicates, in respect of the carry shift, a carry to the next higher denomination and fails to indicate in respect of the noncarry shift, a carry to the next higher denomination.

In order to determine the carry condition of shifts other than those shifts which must necessarily either produce a carry to the next higher denomination or fail to do so, means are provided for determining when any shift not being of the latter type, exceeds the radix of the denomination in which the shift has been made, and accordingly the logic device is arranged so that in response to the said means, it will indicate the carry to the next higher denomination when the radix is exceeded but not otherwise.

An electrical embodiment of the present invention will be described by way of example only, and it will be understood that the basic method is equally applicable to mechanical, pneumatic, hydraulic or other digital number systems where logical operations can be performed. Furthermore, only a decimal number system will be considered in the example to be given.

The embodiment employs a classification of the figures of a denomination and of the shift figures into a lower group, namely 0—4, and an upper group 5—9, and logic operations for which three parameters must be known, namely, the magnitudes (0 to 4 or 5 to 9) of:

i. the original figure;
ii. the desired shift;
iii. the final output figure.

If values in the lower half of a group are represented by $\overline{C}$ and those in the upper half by C, then the necessary condition for determining whether a carry is to be made to the next higher column is satisfied by the Boolean expression:

Carry $1 = C_0 \cdot C_S + C_0 \cdot \overline{C}_S \cdot \overline{C}_F + \overline{C}_0 \cdot C_S \cdot \overline{C}_F$. Where the suffix 0 represents the original data S represents the desired shift F represent the final output.

It follows that, under all other conditions or combinations, nothing is added to the next higher column.

The operation of the expression may be clarified by substituting exemplary numerical values in the equation as follows:

(a) $$C_0 \cdot C_S = \begin{cases} C_0 = 5 \text{ to } 9 \\ +C_S = 5 \text{ to } 9 \end{cases}$$
$$\overline{F \quad 10 \text{ to } 18}$$

For this part of the equation there will always be a "tens" carry.

(b) $$C_0 \cdot \overline{C}_S = \begin{cases} C_0 = 5 \text{ to } 9 \\ +\overline{C}_S = 0 \text{ to } 4 \end{cases}$$
$$\overline{F \quad 5 \text{ to } 13}$$

The carry occurs from 10 to 13 only and is determined by observing that the units are less than 5 to 9, i.e., $\overline{C}_F$.

The logic operation then becomes $C_0 \cdot \overline{C}_S \cdot \overline{C}_F$.

(c) $$\overline{C}_0 \cdot C_S = \begin{cases} \overline{C}_0 = 0 \text{ to } 4 \\ +C_S = 5 \text{ to } 9 \end{cases}$$
$$\overline{F \quad 5 \text{ to } 13}$$

As for (b), the carry is decided by $\overline{C}_F$, giving $\overline{C}_0 \cdot C_S \cdot \overline{C}_F$.

It will be seen that it is only necessary to determine 30 $\overline{C}_F$ (or $C_F$) of the final output in order to complete the second and third parts of the equation.

It should also be noted that, although $\overline{C}_F$ will not exceed 3 in the first or units column in the presence of either $\overline{C}_0 \cdot S_S$ or $C_0 \cdot \overline{C}_S$, this will not be the case in the higher columns, since 1 can be added to the output by the carry, giving a range of 0 to 4 under these conditions.

The operation of an exemplary logic arrangement according to the invention will be made clear in the following description, referring to the accompanying drawings, in which:

FIG. 2 is a block schematic diagram showing the interconnection between elements in an embodiment providing a three decade scale i.e. a scale of three denominations, namely, ones, tens, and hundreds.

Figure 1:
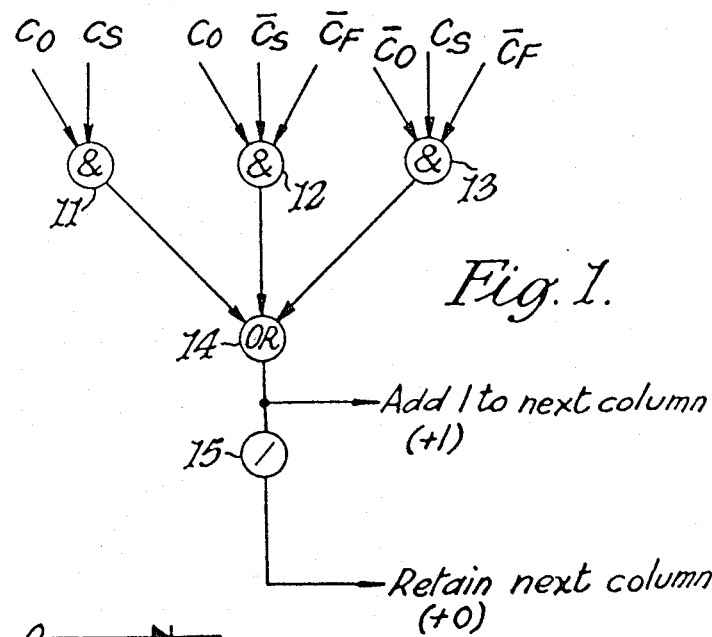
FIG. 1 shows the logic diagram for determining a carry or "add 1" condition; "Add 0" or retain is inferred by inversion.

It will be seen from FIG. 1 that the three parts of the equation are individually treated by AND gages 11, 12 and 13. The AND gage 11 will only produce a signal in the presence of both input signals $C_0$ and $C_s$, and so on. The switching of any one AND gate produces an "Add 1" signal at the output of an OR gate 14. Element 15 is an inverter producing a signal complementary to that of 14, so that there is always a signal from the element 14 or 15.

In FIG. 2 it will be seen that the outputs from a Logic Unit 16 (+0 and +1) are made to operate a +1 Switch 17 in the next higher decade. In the presence of +0 the figures passing through the switch will not be changed, but in the presence of +1 they will be increased by 1. The input signals to the Carry Logic 16 are derived from these sources, namely:

i. the origin of Scale 18;

ii. the amount of shift desired as set on a Shift Switch 19; and iii. the final output from the +1 Switch 17, indicated by 20 in the block schematic.

Figures 3A, 3B:
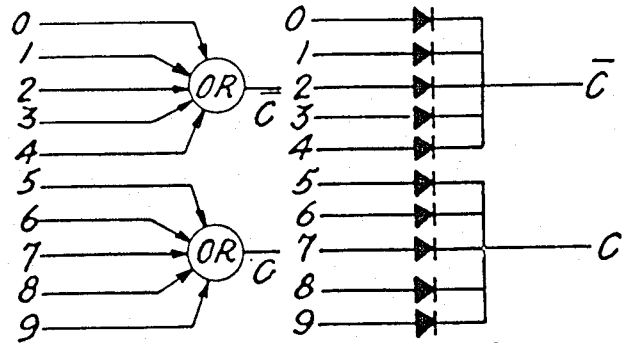
FIG. 3A shows a diode and FIG. 3B a transistor gating arrangement for determining $\overline{C}$ and $C$, when these signals are not already provided.

It is possible that one or all three sources of information 18, 19 and 20 are capable of generating $\overline{C}$ and $C$ signals but, if not, these can easily be determined by simple OR circuits connected to lines 0 to 4 and 5 to 9, as shown in FIG. 3.

Figure 4:
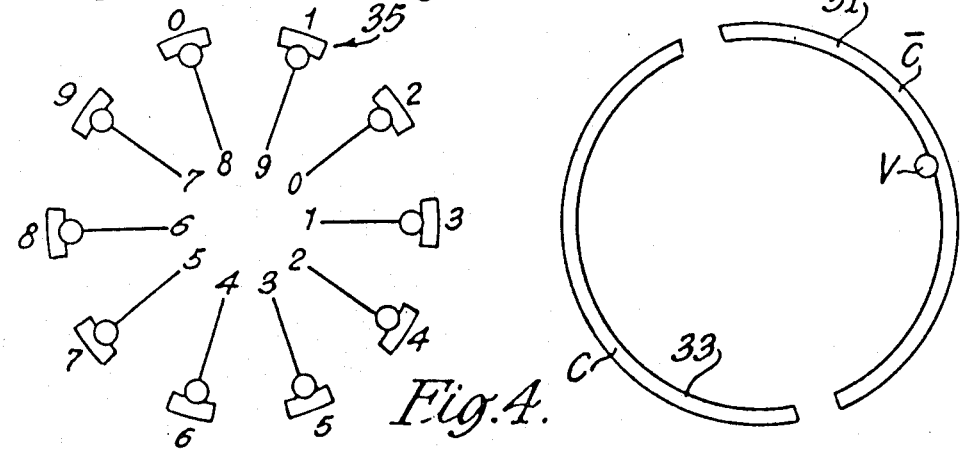
FIG. 4 shows a two bank shift switch configuration.
Figure 5:
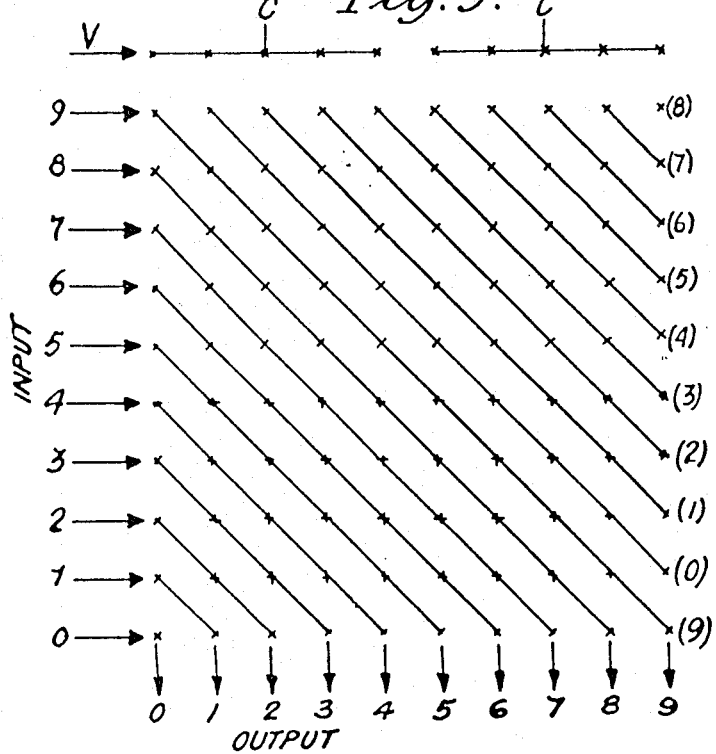
FIG. 5 shows an 11 bank shift switch.

Two examples of Shift Switches are shown respectively in FIGS. 4 and 5. In each case, the switch will indicate $\overline{C}$ and $C$ displacements from the datum; in other words, whether the desired change is from 0 to 4 or 5 to 9.

It will be assumed that, in FIG. 4, outer segments 31 and 33 are stationary and inner contacts 35 are rotatable together, although the inverse could apply. The switch is shown in the "Shift" by 2" position.

FIG. 5 illustrates an assembly of single pole, 10 position switches of conventional type, providing unit displacement of output for unit shift. The eleventh bank is wired to give two 180° rotation signals $\overline{C}$ and $C$ so that the switch will operate from zero position to produce consecutive outputs 1 to 9 and then return to zero. The switch is shown in the zero shift position.

Figure 6:
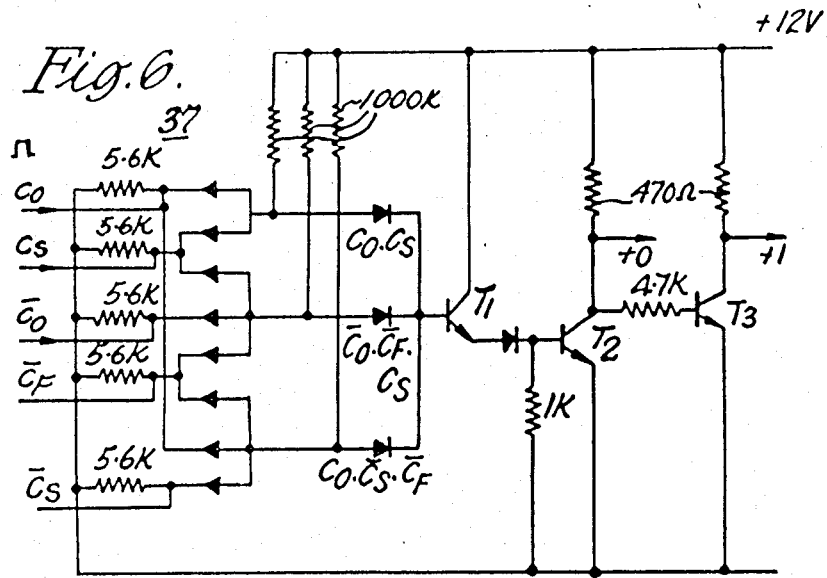
FIG. 6 is a practical circuit for carry logic.

A typical circuit for the Carry Logic is shown in FIG. 6. The input signals $C_o$, $C_s$, $\overline{C}_o$, $\overline{C}_f$ and $\overline{C}_s$ are taken to diode AND gates 37, a transistor $T_1$ acting as an OR gate for the three AND conditions. Transistors $T_2$ and $T_3$ are inverter amplifiers producing +0 and +1 output signals.

Figure 7:
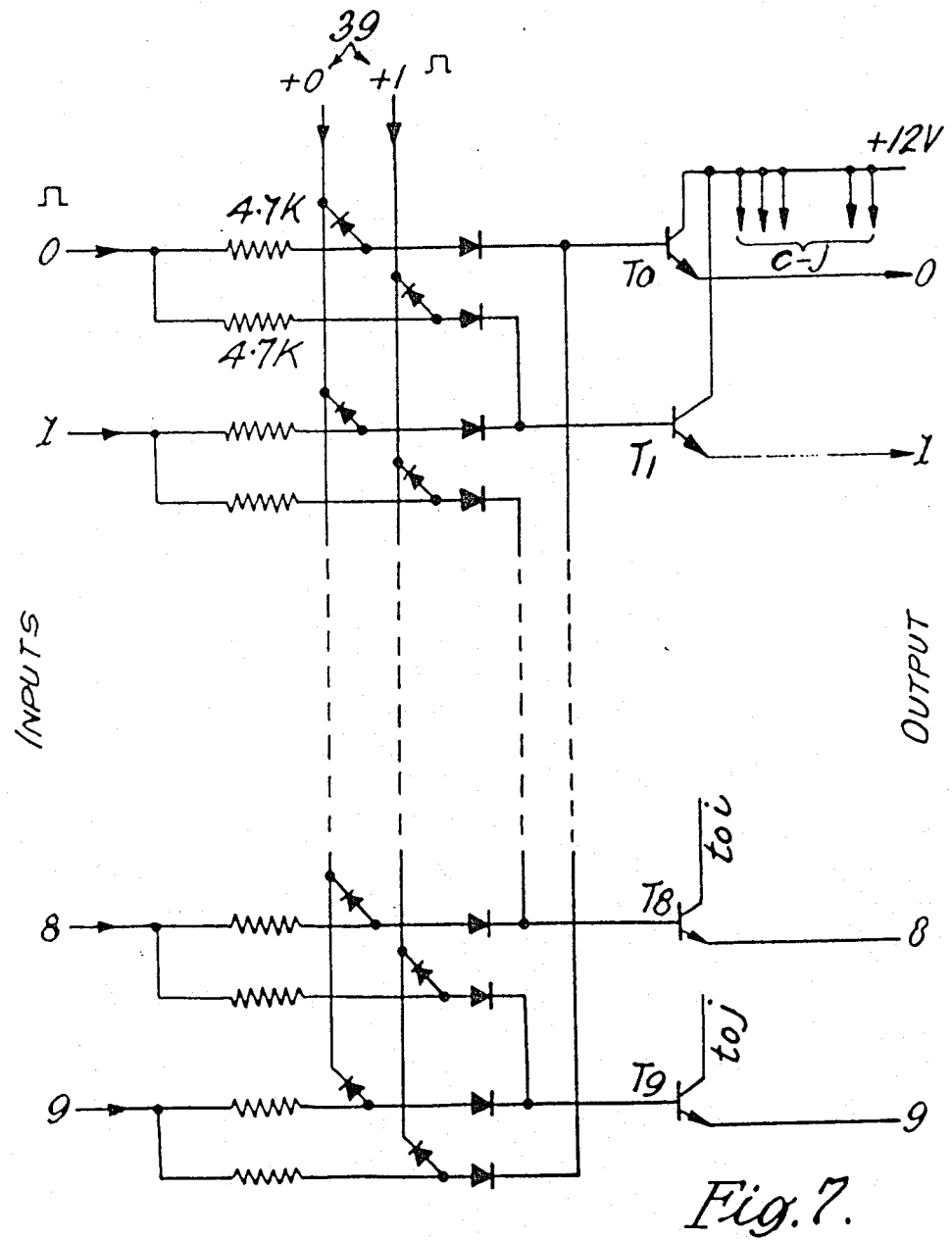
FIG. 7 is a practical circuit for +1 operation.

FIG. 7 is a circuit capable of adding 1 to all inputs, when a +1 instruction is received, at 39 from a Carry Logic circuit. Conversely, it will pass the input signals unchanged, if a +0 instruction is received at 39. It will be seen that each input line is split into two channels, one representing the normal value with zero shift and the other a value higher. Each of the two corresponding output channels may be released or inhibited, according to the states of the +0 and +1 common control lines connected to 39, the diodes connected to these lines acting as clamps. Thus, if a positive signal appears on the input 0, it will appear at the base of a transistor $T_0$ if the +0 line is also positive; it will not do so if the +0 line is at zero potential. This signal will, by the same token, appear at the base of a transistor $T_1$ if the +1 line is positive, so constituting a shift by 1.

In operation of the present invention four possible types of shift can be effected, namely, (1) $\overline{C}_0.\overline{C}_s$; (2) $C_0.\overline{C}_s$; (3) $\overline{C}_0.C_s$ and (4) $C_0.C_s$. In operation of the first type of shift, the shift must necessarily fail to give rise to a carry to the next higher denomination and it may be observed from FIGS. 1, 2 and 6 that when scale 18 and the shift switch 19 are set to give a shift $\overline{C}_0.\overline{C}_s$, the inputs to the AND gages 11, 12 and 13 will not operate the gate. As a result, in the logic circuit as shown in FIG. 6 only transistor $T_2$ conducts and the output produced is the +0 signal (i.e. the logic circuit fails to indicate a +1 carry to the next higher denomination). In operating the second type of shift, a carry to the next higher denomination must necessarily be produced since no shift can give rise to a value of less than 10, and as may be seen from FIGS. 1, 2 and 6 when the scale 18 and the shift switch 19 are set to give a shift $C_0.C_s$, the inputs to AND gate 11 are present and accordingly the gate operates to cause conduction of transistor $T_1$, stop conduction of transistor $T_2$ and cause conduction of transistor $T_3$, thereby producing the +1 signal which is passed on to switch 17. In the two remaining types of shift, the carry logic circuit cannot decide solely from the inputs $\overline{C}_0.C_s$ and $C_0.\overline{C}_s$ determine whether the +1 carry is needed and in both these cases as explained above, when the shift exceeds the radix of the denomination to give any of the values 10 to 13, the switch 19 will produce one of the outputs 0 to 3 and consequently the final output device 20 (FIG. 2) will provide a third input $\overline{C}_f$ to AND gate 12 or 13 as the case may be. In this event, the carry logic circuit is operated to produce the +1 carry signal. Although the switch 19 will also produce one of the outputs 0 to 3 for other shifts i.e. $\overline{C}_0.\overline{C}_s$ shifts, where the product is less than 5, there is no ambiguity created by the switch 19 since in the case of the latter shift, the final product signal $\overline{C}_f$ from device 20 would not be accompanied at the carry logic circuit by the combination of $C_0.\overline{C}_s$ inputs or the combination of $\overline{C}_0.C_s$ inputs needed to produce a +1 carry signal.

It will be understood that other circuits can be constructed to perform the same functions and that these described are given by way of example only and that the term "sshifting" employed in the present specification is inclusive of the notional shift produced by the application of a shift figure of zero.

I claim:

1. In a digital measuring system comprising:

transducer means providing a plurality of groups of parallel digital outputs, each group of which is fed to a particular one of a plurality of displays, said system using a multidenominational number system of the general from $X=A_NR^N+....A_2R^1+A_1R^1+A_0$ wherein $R$ represents the radix of the number system used, each $A$ represents a corresponding group of said digital outputs and the actual digit displayed in each display has a range of values between 0 and $R-1$ and $X$ is the actual entire number displayed when it is read from all of the displays, the improvement comprising apparatus for adding numbers to each of said groups of digital outputs so that the said displays will display the sum of the numerical value of the output from the transducer and another desired number;

said apparatus including a plurality of first means, each for adding a number $M$ where $0 \leq M \leq R-1$ independently of the operation of all the other first means, to a corresponding group of said digital outputs to produce a new output $S$ which is fed to a corresponding display, and another output $Y$;

a plurality of second means each connected to the output of said transducer for producing a digital output 0 representing the value of the original group of said digital output corresponding thereto;

a plurality of third means for producing a digital signal from each display;

a plurality of carry logic circuits to which are fed the said outputs $Y$, $O$ and $X$ for determining whether or not a should be added to the $S$ output of the particular said first means which corresponds to the group of digital output represented by $A_N$ as a result of adding a number $M$ to the group of digital outputs represented by $A_{N+1}$;

a plurality of switch means each connected between the output of a said first means and a display, and each responsive to the output of one of said logic circuits and operative to add a 1 to the value of $S$, and to feed the resulting $S+1$ to the corresponding display.

2. In the digital measuring system as defined in claim wherein said selected radix is the number 10.

3. In a digital measuring system as defined in claim wherein said selected radix is the number 2.

4. In a digital measuring system as defined in claim wherein said logic device ORS said signals.